(12) United States Patent
Barnaud et al.

(10) Patent No.: US 7,951,317 B2
(45) Date of Patent: May 31, 2011

(54) METHOD OF PRODUCING A COMPOSITE PART FROM HIGH-DENSITY GLASS GRANULES

(75) Inventors: Yohann Barnaud, Jacob Bellecombette (FR); Jean-Philippe Gasca, St-Jean de la Porte (FR); Ludovic Chichignoud, La Bauche (FR)

(73) Assignee: OCV Intellectual Capital, LLC, Toledo, OH (US)

( * ) Notice: Subject to any disclaimer, the term of this patent is extended or adjusted under 35 U.S.C. 154(b) by 0 days.

(21) Appl. No.: 11/913,322

(22) PCT Filed: May 2, 2006

(86) PCT No.: PCT/FR2006/050404
§ 371 (c)(1),
(2), (4) Date: Dec. 26, 2007

(87) PCT Pub. No.: WO2007/000516
PCT Pub. Date: Jan. 4, 2007

(65) Prior Publication Data
US 2008/0193757 A1 Aug. 14, 2008

(30) Foreign Application Priority Data
May 4, 2005 (FR) ...................... 05 51179

(51) Int. Cl.
*B29C 45/14* (2006.01)
*B29B 17/02* (2006.01)
(52) U.S. Cl. ........................................ 264/241; 428/392
(58) Field of Classification Search .................. 264/241; 428/392, 325, 391
See application file for complete search history.

(56) References Cited

U.S. PATENT DOCUMENTS

| | | | | |
|---|---|---|---|---|
| 3,077,094 A | * | 2/1963 | Jacquest et al. | 65/135.8 |
| 4,116,921 A | * | 9/1978 | Olivo et al. | 524/594 |
| 4,414,342 A | * | 11/1983 | Falk et al. | 523/437 |
| 5,470,658 A | * | 11/1995 | Gasca et al. | 428/391 |
| 5,998,029 A | | 12/1999 | Adzima et al. | |

(Continued)

FOREIGN PATENT DOCUMENTS

CN 1656032 8/2005
(Continued)

OTHER PUBLICATIONS

International Search Report and Written Opinion from PCT/FR06/50404 dated Dec. 14, 2006.
(Continued)

*Primary Examiner* — Kat Wyrozebski
*Assistant Examiner* — Daniel Lee
(74) *Attorney, Agent, or Firm* — Calfee, Halter & Griswold LLP (57) ABSTRACT

A method of producing a composite part formed of a thermoplastic matrix reinforced with long glass fibers is provided. The method includes supplying a thermoplastic resin and high density glass granules to an injection or injection-compression device containing a single screw. The high density glass granules include long chopped strands formed of glass filaments sized with a sizing composition. The chopped glass strands may have a length from 6 to 30 mm. In addition, the glass granules may have a glass density between 90 and 99.5% and may have a length to diameter ratio (L/D) ratio of less than L, which is expressed in mm. A composite part obtained using the disclosed method is also provided.

20 Claims, 2 Drawing Sheets

U.S. PATENT DOCUMENTS

| | | | |
|---|---|---|---|
| 6,020,065 A * | 2/2000 | Girgis et al. | 428/378 |
| 6,274,074 B1 * | 8/2001 | Monie | 264/255 |
| 6,428,728 B1 * | 8/2002 | Sakai et al. | 264/171.13 |
| 6,548,605 B1 * | 4/2003 | Morita et al. | 525/330.6 |
| 2005/0214524 A1 * | 9/2005 | Blanchard et al. | 428/325 |

FOREIGN PATENT DOCUMENTS

| | | |
|---|---|---|
| FR | 2 839 967 | 11/2003 |
| WO | 96/40595 | 12/1996 |
| WO | 98/43920 | 10/1998 |
| WO | 01/05722 | 1/2001 |
| WO | 03 097543 | 11/2003 |
| WO | 07/00516 | 1/2007 |

OTHER PUBLICATIONS

Communication from European Application No. 06794391.0 dated Jan. 27, 2010.

Office action from Chinese Application No. 200680015075.0 dated Jun. 12, 2009.

Office action from Chinese Application No. 200680015075.0 dated Apr. 23, 2010.

Search Report from French Patent Application No. 551,179 dated Jan. 18, 2006.

* cited by examiner

METHOD OF PRODUCING A COMPOSITE PART FROM HIGH-DENSITY GLASS GRANULES

The present application is the US counterpart of WO 2007/000516, the text of which is incorporated by reference and claims the priority of the French application No. 05/51179 filed on 4 May 2005.

The invention relates to the field of the manufacture, by injection or injection-compression molding of a composite product or part formed essentially from a thermoplastic organic material reinforced by long glass fibers, that is to say with the initial length of the chopped glass fiber typically being between 6 and 30 mm. More precisely, according to the present invention, an injection molding or injection-compression molding process is described, carried out by a device comprising a single screw (hereinafter a "single screw extruder") fed with thermoplastic organic material and with reinforcing fibers, said fibers being obtained by chopping glass strands, for example beneath a bushing or from rovings.

For the sake of abbreviation, the term "matrix" denotes in the following text said thermoplastic organic material forming a portion of the molded composite material finally obtained. Likewise in what follows, the term "injection molding" denotes all injection and injection-compression molding processes and the term "long fibers" denotes fibers as described above.

The manufacture of objects made of composite material by the injection molding of an organic material and reinforcing strands in a mold permits the difficulties of mixing said constituents to be solved: on the one hand, it is necessary to obtain the most homogeneous possible mixing between the organic material and the reinforcement, the degree of reinforcement having to be as constant as possible, before the molding operation and, on the other hand, it is important for the reinforcing strands to impart the best mechanical properties to the composite product manufactured. To do this, it is essential to obtain a good dispersion of the reinforcing strands in the matrix and in particular to avoid excessive fragmentation of said strands. These difficulties are greater the longer the strands to be mixed with the thermoplastic matrix.

In the simplest manner, it is conceivable to carry out this mixing operation using a device comprising a heated cylinder in which an Archimedes' screw or single screw rotates under the action of a motor. This cylinder includes, in the upper portion of one of its ends, at least one hopper, the base of which opens directly onto the Archimedes' screw. The device is fed with organic material and with glass strands via this hopper.

The organic material, in the form of granules and the reinforcing fibers, in the form of chopped strands, are for example introduced as a preblend into the hopper or as a blend into the hopper by the use of metering devices.

However, the studies carried out by the Applicant have shown that such a method, although it is possible and can be used for conventional short fibers, that is to say for fibers with a length substantially less than 6 mm, could however not be used in the case of the introduction of longer fibers for the following reasons:

a) the glass content in the final part is indeterminate and not constant.

To obtain a defined glass content in injection-molded composite parts from long chopped strands has proved to be impossible because they are not transportable and they cannot be metered, since they do not flow. This problem appears in particular during:

(pneumatic) transport of the long chopped strands:

During production of chopped strands (manufacturing process), the chopping of the glass fiber filaments results in the appearance of fines. These fines are sources of fuzz formation and clogging, making it impossible to transport the chopped strands right to the hopper. In addition, the excessively high length/diameter ratio (L/D) of the long chopped strands precludes their proper flow. It is impossible to obtain proper flow of the long chopped strands within their very packaging and also in the transport means normally used, which allow the feed hoppers of standard injection molding devices to be joined together. The L/D ratio of the long chopped strands results in the formation of bridges by intermingling, and finally precludes any movement of the fibers; and metering of the long chopped strands:

The chopped glass strands are metered by metering devices (for example weigh feeders) on the basis of a constant flow of the materials, the times during which the feed hatches are open being regulated according to the flowability. Metering long chopped strands proves to be impossible because of the formation of bridges.

b) the surface appearance of the injection-molded composite parts is unsatisfactory:

Surface appearance problems arise because of the poor dispersion of the long chopped strands. This results in the glass fibers being concentrated in certain surface portions of the composite part.

The single-screw device used for the conversion by the injection molding process allows the plastic matrix to be plasticized but does not allow, because of the low shear generated, a homogeneous dispersion of glass fibers within the matrix to be obtained, some of said fibers being neither dispersed in the matrix nor impregnated by the matrix.

This poor dispersion giving rise to the observed surface defects is also the reason for the impairment in the mechanical properties of the composite part obtained by injection molding (see point c) below).

c) The mechanical properties of the composite part obtained are poor:

The poor dispersion, or even sometimes the non-impregnation of the glass strands, results in a significant drop in the mechanical properties of the composite obtained after injection molding, such as a drop in the tensile strength, flexural strength or Charpy impact strength.

To avoid these problems, in the case of thermoplastic composites based on chopped glass strands, a two-step process is currently used:

a first step employing a twin-screw extruder, generating high shear, in order to allow good dispersion and impregnation of the fiber by the thermoplastic matrix. This twin-screw extruder makes it possible for the chopped strands to be highly stressed, in order to separate the glass filaments by shear and to permit the fibers thus obtained to be impregnated, while still ensuring that they are dispersed within the matrix. In the case of reinforced thermoplastic composites based on chopped glass strands, this high shear exerted also has the effect of greatly reducing the length of the fiber in the matrix, this being predominantly less than 1 mm. The extrudates obtained on leaving the die are then chopped into granules using a granulator; and in a second step, these granules obtained are used in a conventional injection molding device of the single-screw type. Examples of such processes are described for example in patent applications WO 96/40595, WO 98/43920, WO 01/05722 or WO 03/097543.

Such a process therefore involves two separate steps, a step of formulating a fiber-reinforced granule by extrusion and a step of forming said granule. The first step requires equipment that is expensive and not widely available, that is to say a twin-screw extruder and is usually carried out by the formulator (or compounder), the second step being carried out by the converter on the composite part production site.

It follows from the foregoing that there is a need, known for a long time, for a simpler, inexpensive and flexible process allowing long glass strands in the form of long fibers to be easily inserted into composite materials.

Such a process forms the subject matter of the present invention.

BRIEF DESCRIPTION OF THE DRAWINGS

The advantages of this invention will be apparent upon consideration of the following detailed disclosure of the invention, especially when taken in conjunction with the accompanying drawings wherein.

The present invention thus makes it possible to produce thermoplastic parts reinforced by long fibers, starting from long chopped strands, while meeting the technical constraints of the process and of the composite obtained, using only a standard injection molding device of the single-screw type. In particular, this allows very satisfactory control of the glass content of the composite part, a pleasing surface appearance and a good level of mechanical properties.

More precisely, the present invention relates to a process for manufacturing a composite part formed by the association of a thermoplastic matrix reinforced with long glass fibers, said process comprising an injection molding or injection-compression molding step carried out by a device comprising a single-screw extruder fed with said material and said reinforcement, said process being characterized in that the reinforcing fibers are introduced into said device in the form of granules of long chopped strands, the density or glass content of which is between 90 and 99.5%, preferably between 95 and 99%, and the L/D ratio is less than L, expressed in mm.

Typically, the L/D ratio is less than 30 for a granule of length L equal to 30 mm, less than 24 for a 24 mm granule and less than 12 for a 12 mm granule.

Preferably, the L/D ratio is less than 2/3 of L, expressed in mm. For example, said ratio is less than 20 for a granule of 30 mm length, less than 16 for a 24 mm granule and less than 8 for a 12 mm granule.

According to one possible embodiment, the L/D ratio is between L/4 and L/2, L expressed in mm, for example the L/D ratio is between 7.5 and 15 for a granule of 30 mm length, between 6 and 12 for a 24 mm granule and between 3 and 6 for a 12 mm granule.

Within the context of the present invention, if the granule has a circular cross section, the diameter D to be considered for the application of the present process is equal to the smallest measured value of said cross section.

The high-density glass granules according to the invention are for example synthesized using the principles, processes and apparatus described in patent applications WO 96/40595, WO 98/43920, WO 01/05722 or WO 03/097543 to which the reader may refer for the implementation of said synthesis.

As an example, the glass strands used within the context of the invention are generally manufactured using the following succession of steps:

fiberizing the filaments in a wet atmosphere through the bushings from molten glass;
sizing the filaments by a sizing liquid;
collecting the filaments into strands; and
chopping the strands to form glass strands with a length of between 6 and 30 mm.

At this stage, the chopped strands are wet. They generally comprise from 5 to 25% by weight of water, for example from 5 to 15% by weight of water. Generally it is unnecessary to dry them before they are introduced into a mixing step, known per se from the abovementioned documents, this step having to be carried out in the presence of water and possibly in the presence of a binding agent. Thus, added to the mixing apparatus, for example of the type of those described in WO 03/097543, is the possible complement of water (relative to the water provided by the fiberizing step) needed to obtain a total water content ranging from 10 to 25% by weight of the mass introduced into the mixing apparatus. It is possible, and preferable, not to have to add a complement of water (reduced fouling of the granulator and increased yield. To do this, it suffices to fiberize at a sufficient humidity to obtain correct granulation.

In general, the mixing is carried out for a time long enough for the increase in density of the chopped strands to be substantial and to do so using a mixing apparatus imparting, at each instant, the same mixing frequency to the strands or granules being formed that it contains, the granules finally formed containing for example, after drying, at least 95%, preferably at least 97% and very preferably at least 99% by weight of glass, the possible bonding agent being in contact with the glass strands at the latest during the mixing operation.

According to one possible embodiment, before the mixing operation, the ingredients of the blend intended to be mixed are introduced into the mixing apparatus. Therefore, the following are introduced:

the chopped sized strands;
water in an amount of 10 to 25% by weight of the total mass of said blend; and
possibly a binding agent.

According to one possible embodiment, the binding agent may be chosen from the compounds cited in application WO 03/097543, such as:

polyesters;
polyurethanes;
epoxy polymers, for example a polymer of the diglycidyl ether of bisphenol A;
epoxy/polyurethane copolymers;
grafted polypropylenes.

According to one possible embodiment, the binding agent may be chosen from EVA (ethylene-vinyl acetate) and EEA (ethylene-acrylic acid) as described in the rest of the description. The binding agent is in general chosen according to the nature of the thermoplastic to be reinforced.

The chopped strands agglomerate, by being juxtaposed during the mixing, to form the granules, with no modification of their length. Thus, the granules are substantially in the form of cylinders having a length substantially identical to that of the longest strands introduced at the start.

It is possible to use chopped strands having a length ranging from 6 to 30 mm, for example 8 to 24 mm and typically 9 to 15 mm and more particularly a mean length of about 9 mm, 12 mm or 15 mm.

It is also possible to use, as strands, a mixture of strands with different lengths.

The starting chopped strands may also include fines, since these fines participate in the granulation by agglomerating, in order to be inserted into the granules.

The filaments contained in the strands may have a diameter ranging for example from 5 to 24 μm.

The mixing is carried out for the time sufficient to obtain the desired length/diameter ratio of the granules and/or the desired increase in density. According to the invention, the density of the granules prepared is in general greater by at least 35%, or by at least 50%, or by at least 67%, or by at least 80%, or by at least 100%, or by at least 130%, or by at least 200% of the density of the starting chopped strands.

The high-density glass granule according to the invention generally has a loss on ignition that is strictly less than 2.0% and even less than 1.5%, for example ranging from 0.5 to 1.5%, especially ranging from 0.7 to 1.2%.

An example of a final granule according to the invention comprises a multitude of parallel glass filaments with a unit diameter that may range from 5 to 24 μm, these filaments all having the same nominal diameter or having different nominal diameters. The number of filaments contained in a granule may in particular range from 1000 to 100 000, depending on the diameter of the filaments, for example 2000 to 50 000. The stacking of the filaments in the granules is usually of compact nature.

For example, the thermoplastic matrix may be chosen from the group consisting of polypropylenes (PP), polyamides (PA), polyethylene terephthalate (PET) or polybutylene terephthalate (PBT), styrenics, such as acrylonitrile-butadiene-styrene (ABS), polyethylene (PE), polyphenylene sulfide (PPS), polycarbonate (PC), and polyacetals, such as polyoxymethylene (POM).

According to a preferred embodiment of the present invention, it has also been discovered that the above manufacturing process can also be improved by using a size having a melting point below that of the thermoplastic matrix. The difference between said melting points is the highest possible and advantageously greater than 5° C., preferably greater than 7° C. and very preferably greater than 10° C. or 20° C. or even 25° C. The term "melting point" is understood within the context of the description as the temperature at which at least 50% by weight, preferably at least 70% by weight and very preferably at least 90% by weight of the solids content of the size is in molten form.

For example, when a polypropylene (PP) matrix is used, a sizing liquid suitable for manufacturing long high-density glass fiber granules, making it possible to obtain all of the features presented above, comprises:

an aqueous EVA (ethylene-vinyl acetate) emulsion, the copolymer of which has an ethylene content of 50% or higher and a melting point of around 110° C., or an aqueous EAA (ethylene-acrylic acid) emulsion, the copolymer of which has an ethylene content of 50% or higher, and a melting point of around 110° C.;

an aqueous emulsion of maleic-anhydride-grafted polypropylene (MAH-g-PP), the melting point of the polymer of which is around 165° C.; and one or more organosilanes, at least one of which is of the amino silane type, and, optionally:

a stabilizer for the formulation, such as N-butylamine (which evaporates during drying);

an aqueous emulsion of a film-forming polymer, such as polyurethane (PU); and process aids, such as surfactants and/or lubricants and/or antistatic agents.

The solids content of these sizes is around 10% by weight of the initial weight of the blend. Table 1 summarizes the respective contents of the various constituents of the sizing liquid used for the exemplary embodiments of the invention:

TABLE 1

|  | Content (wt % of the dry matter) | Preferred contents (wt % of the dry matter) |
|---|---|---|
| Silane | 1-40 | 5-20 |
| EVA and/or EAA | 10-99 | 40-70 |
| MAH-g-PP | 1-30 | 10-20 |
| PU | 0-20 | 0-10 |

Typical sizing formulations are, for example, as percentages of solid (dry) matter:

|  | No. 1 | No. 2 | No. 3 |
|---|---|---|---|
| Silane | 10% | 10% | 10% |
| EVA | 70% | 60% | 0% |
| EAA | 0% | 0% | 70% |
| MAH-PP | 20% | 20% | 20% |
| PU |  | 10% |  |

The products used during the trials carried out by the Applicant are sold under the following references:
Silane: Silquest A1100® (GE), AMEO® (Degussa);
EVA: EVAX28® (Michelman);
EAA: Michem Prime 4983® (Michelman), AC5120® ammonium salt in water (Honeywell);
MAH-g-PP: Michem 43040® (Michelman), Novacer 1800® (BYK Cera);
PU: Witcobond 290H® (Crompton), Baybond PU401® (Bayer).

Depending on the nature and the content of the various constituents of the size thus obtained, the melting point of the latter is, according to the invention, between 155 and 120° C., that is to say at least 7° C. below that of the PP matrix.

The use of high-density glass granules and long fibers preferably combined with the use of a size as described above makes it possible to obtain, on the composite part obtained directly by standard injection molding or injection-compression molding:

a predetermined and constant glass content;
a homogeneous surface appearance;
enhanced mechanical properties.

The invention is characterized in that a single-screw device ensures that the step of blending the initial constituents of the part, that is to say the matrix and the fibers, and the molding step are carried out.

In particular, control of the glass content and the dispersion of the fibers in the composite parts injection-molded in such a process are improved thanks:

on the one hand, to the step of granulating the chopped glass strands with a view of increasing the level and constancy of the density thereof and, consequently, their proper flow (for an appropriate L/D ratio) during the steps of transporting and metering the reinforcing fibers; and on the other hand, to the nature of the size, which ensures, during these same steps, good integrity and strength of the high-density glass granules during the transport, often by air, of the fiber into the injection molding machine and during metering, and then during the injection molding step, good dispersion of the fibers within the thermoplastic matrix.

The composite product finally obtained furthermore exhibits improved mechanical properties, as may be observed in the examples that follow.

Figure 1:
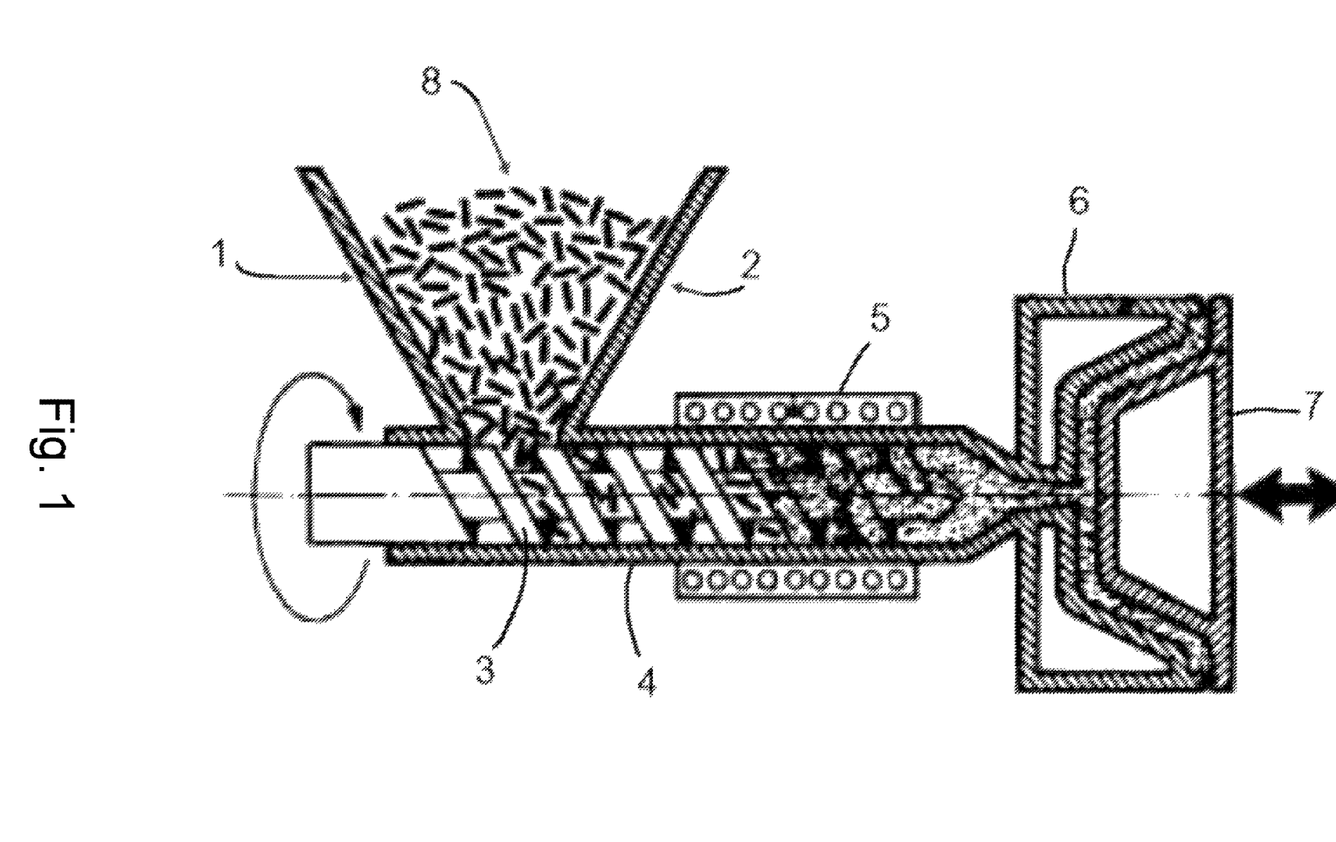
FIG. 1 is a schematic illustration of an injection molding process according to one embodiment of the present invention.

FIG. 1 illustrates an exemplary embodiment of an injection molding process according to the invention. Thermoplastic resin, for example polypropylene, granules and high-density glass granules, that is to say those with for example a glass content of greater than 95%, are introduced in the form of a blend 8 into a feed hopper 2 of a molding device 1 for injection molding a composite part. Pneumatic transport (not shown in FIG. 1) is used to convey the high-density glass granules to the hopper 2. The device 1, apart from the hopper 2, comprises a single-screw 3 placed in a barrel 4, the walls of which are heated by annular resistors 5, typically at a temperature between 200 and 300° C. The respective properties of the two types of granules are adjusted upstream, using known techniques, for example by means of weigh feeders. Under the combined effect of the heat generated by the heating resistors 5 on the walls of the barrel 4 and of the friction against said walls, the thermoplastic resin granules are plasticized and the melting of the size results in a homogeneous dispersion of the fibers in the thermoplastic matrix. In the standard injection molding device, the single screw fulfils two functions according to the present process:

by rotating and receding, a plasticization function, for plasticizing the thermoplastic material; and
by sliding in the barrel 4, after plasticization, a piston function for filling the mold 6/countermold 7 system.

A composite part, the glass content of which is substantially constant during production, with a satisfactory surface appearance and exhibiting good mechanical properties is finally obtained.

Of course, the above embodiment of the invention in no way restricts the invention to any of the aspects described. In particular, without departing from the scope of the invention, the thermoplastic resin granules and the high-density glass granules could be injection-molded at different points in the device. More generally, any known injection molding device may be used to implement the present process.

The process according to the invention and its advantages will for example be illustrated by the nonlimiting examples below.

Example 1

Long chopped strands were prepared using a sizing liquid comprising an aqueous emulsion based on polypropylenes grafted with maleic anhydrides of the following formulation:
70% by weight of an aqueous maleic-anhydride-grafted polypropylene emulsion sold by the company Michelman under the reference Michem 43040®, the degree of grafting of which is 4% by weight, the acid number is 45 and the weight-average molecular weight is 9100;
10% by weight of γ-aminopropyltriethoxysilane (silane), sold under the reference "Silquest® A-1100" by General Electric; and
20% by weight of a polyurethane (PU) sold under the reference "Baybond® PU401" by Bayer.

The preparation of the sizing composition was carried out as follows:

ethoxy groups of the silane were hydrolyzed in demineralized water maintained under stirring, and then the other constituents, again with stirring, were added. The weight content of solid materials in the sizing composition was equal to 10%.

The sized strands were obtained as follows:

the sizing compositions were used to coat, in a known manner, E-glass filaments with a diameter of about 17 μm, these being drawn from streams of glass flowing out of the orifices of a bushing, and then assembled into strands each with 500 filaments.

The strands obtained after the fiberizing and sizing steps were chopped in order to obtain long chopped strands with a mean length of 12 mm±1 mm, a flat shape, that is to say on average 2 mm in width by 0.5 mm in thickness. The measured density of such chopped strands was 0.40 g/cm³.

Example 2

Long chopped strands were synthesized using conventional processes. The sizing liquid used to assemble the filaments into strands after fiberizing contained the following constituents in percentages of dry matter:
70% by weight of an aqueous EVA (ethylene-vinyl acetate) emulsion sold by the company Michelman under the reference EVAX28®, the ethylene weight content of which is 82% and the melting point around 110° C.,
20% by weight of the aqueous maleic-anhydride-grafted polypropylene emulsion sold by Michelman under the reference Michem 43040®, the degree of grafting of which is 4% by weight, the acid number is 45, the weight-average molecular weight is 9100 and the melting point of the polymer is around 165° C.; and
10% by weight of γ-aminopropyltriethoxysilane (silane) sold under the reference "Silquest® A-1100" by General Electric.

The sizing composition was obtained in a manner similar to that described in Example 1.

The measured melting point of the size (solids content) thus obtained started at a temperature of about 120° C. and continued up to about 150° C.

The strands were obtained and sized in a manner similar to that described in Example 1.

The strands obtained were then chopped using known techniques in order to obtain long chopped strands with a mean length of 12 mm±1 mm, of flat shape (2 mm in width by about 0.2 mm in thickness) and a density of 0.40 g/cm³.

Example 3

High-density glass granules with a mean length of 12 mm±1 mm, of substantially cylindrical shape and mean diameter 2.5 mm for a density of 0.80 g/cm³ were obtained by densifying the long chopped strands obtained in Example 2 using the process and mixing device described in application WO 03/097543, until a granule with a glass density close to 99% was obtained. The loss on ignition of the granule, measured using conventional techniques, was less than 1%.

Example 4

Thermoplastic granules comprising 30% by weight of glass fibers chopped to 12 mm±1 mm dispersed in a PP matrix, with a diameter of about 2.5 mm and a density of 0.70 g/cm³ were used. These granules are sold under the reference Celstran® by Ticona. The granules were prepared using wellknown techniques by impregnating a glass roving with the polypropylene matrix, the percentage by weight of said matrix being 70%.

Example 5

Using a protocol identical to that of Example 3, high-density glass granules with a mean length of 12 mm±1 mm, of substantially cylindrical shape and of mean diameter 2.5 mm for a density of 0.83 g/cm$^3$ were obtained by densifying the long chopped strands obtained in Example 1, until a granule having a glass density close to 99% was obtained. The loss on ignition of the granule, measured using conventional techniques, was less than 1%.

Example 6

A flow test, for testing the flow of the granules of fibers obtained according to Examples 1 to 5, was carried out. This test made it possible to evaluate the flowability of the chopped strands or granules under predetermined conditions. This capability is expressed in seconds.

The flow time was measured on a 5 kg amount of product. The product was placed in a hopper, the evacuating space or duct of which was located 28.5 mm from a flow channel vibrating with an amplitude of 1 mm.

Table 2 summarizes the results obtained in this flow test for each of the products.

tion hopper of conventional technology, causing product to pass along a critical circuit, that is to say promoting the formation of fibrils or fuzz of glass strand filaments. After the test, the mass of fuzz accumulated on the filter of the pneumatic hopper is measured. The amount of fuzz obtained is expressed in mg/kg.

3. Fines Test Carried Out After the Pneumatic Transport Test

This test is identical in its application to the test described in point 1, but it is applied this time after the pneumatic transport test.

4. PSI Test (Pneumatic Stress Integrity Test)

This test consists in simulating pneumatic transport at high pressure of chopped strands or granules. This test, considerably harsher than the transport tests that we were able to find in industry, allows the products to be subjected to very large stresses.

A 50 gram amount of product is rotated in a closed stainless steel circuit for 45 seconds and under a pressure of 5 bar (0.5 MPa).

This test allows the moving product to be stressed and its resistance to friction, product on product, and also product on stainless steel wall, to be evaluated. After the test, the product is recovered and screened so as to separate off the fuzz.

The result of this test is expressed in Table 3 as a percentage of fuzz formed as a function of the initial mass of the product.

TABLE 2

|  | Example 1: long chopped strands, grafted PP size | Example 2: long chopped strands, EVA size | Example 3: 99% glass granules, EVA size | Example 4: thermoplastic granules (30% glass) | Example 5: 99% glass granules, grafted PP size |
|---|---|---|---|---|---|
| flowability (s/kg) | Impossible (formation of bridges) | Impossible (formation of bridges) | Acceptable (<15 s/kg) | Acceptable (<15 s/kg) | Acceptable (<15 s/kg) |

Example 7

The transportability of the various fibers or granules synthesized according to Examples 1 to 5 was also evaluated by several tests:

1. Test for Evaluating the Content of Fines of the Chopped Strands and Granules (Test Fines)

The term "fines" is understood to mean fine glass rods or filaments that are separated from the initial product during its transport.

The content of fines is considered to be the amount of fines collected under the following conditions on a specimen consisting of 500 grams of product in a trap, by suction.

The product to be tested was placed in a hopper, the outlet of which was located 4 mm from a vibrating channel, allowing the product to flow and spread homogeneously. A suction system with the fines trap was located above this vibrating channel so as to capture all the free glass rods or filaments.

The fines content is expressed in Table 3 in mg/kg. A value of 50 or less is deemed to be satisfactory.

2. Pneumatic Transport Test (Transport Test)

This test consist in simulating pneumatic transport of the chopped strands or granules, from a storage zone to a feed hopper of an injection molding machine, for example of the type described in relation to FIG. 1. Two kilograms of the product to be tested (chopped strands or granules) are placed in a storage container and then sucked up by pneumatic injec-

TABLE 3

|  | Example 1: long chopped strands, grafted PP size | Example 2: long chopped strands, EVA size | Example 3: 99% glass granules, EVA size | Example 4: thermoplastic granules (30% glass) | Example 5: 99% glass granules, grafted PP size |
|---|---|---|---|---|---|
| Fines test (mg/kg) | >300 | >300 | ≦50 | ≦50 | ≈50 |
| Transport test (g/kg) | impossible | impossible | 0.2 | 0.2 | 50 |
| Fines test transport (mg/kg) | impossible | impossible | ≦50 | ≦50 | ≦50 |
| PSI test (%) | 100% | 100% | <1% | <1% | <4 to 7% |

Example 8

The glass content obtained on the composite part finally obtained was measured for long chopped strands and the granules using the device described in relation to FIG. 1, the blending in the hopper being obtained by weighing, using a gravimetric system sold by Maguire. The fibers or granules were introduced as a blend into the hopper in proportions that were adjusted in order to obtain, on the final composite part, a glass content of 30% by weight. In this case of the use of granules according to Example 4, the latter, with an already predetermined glass content of 30%, were of course introduced alone into the hopper, that is to say without blending with a glass component vector.

Figure 2:
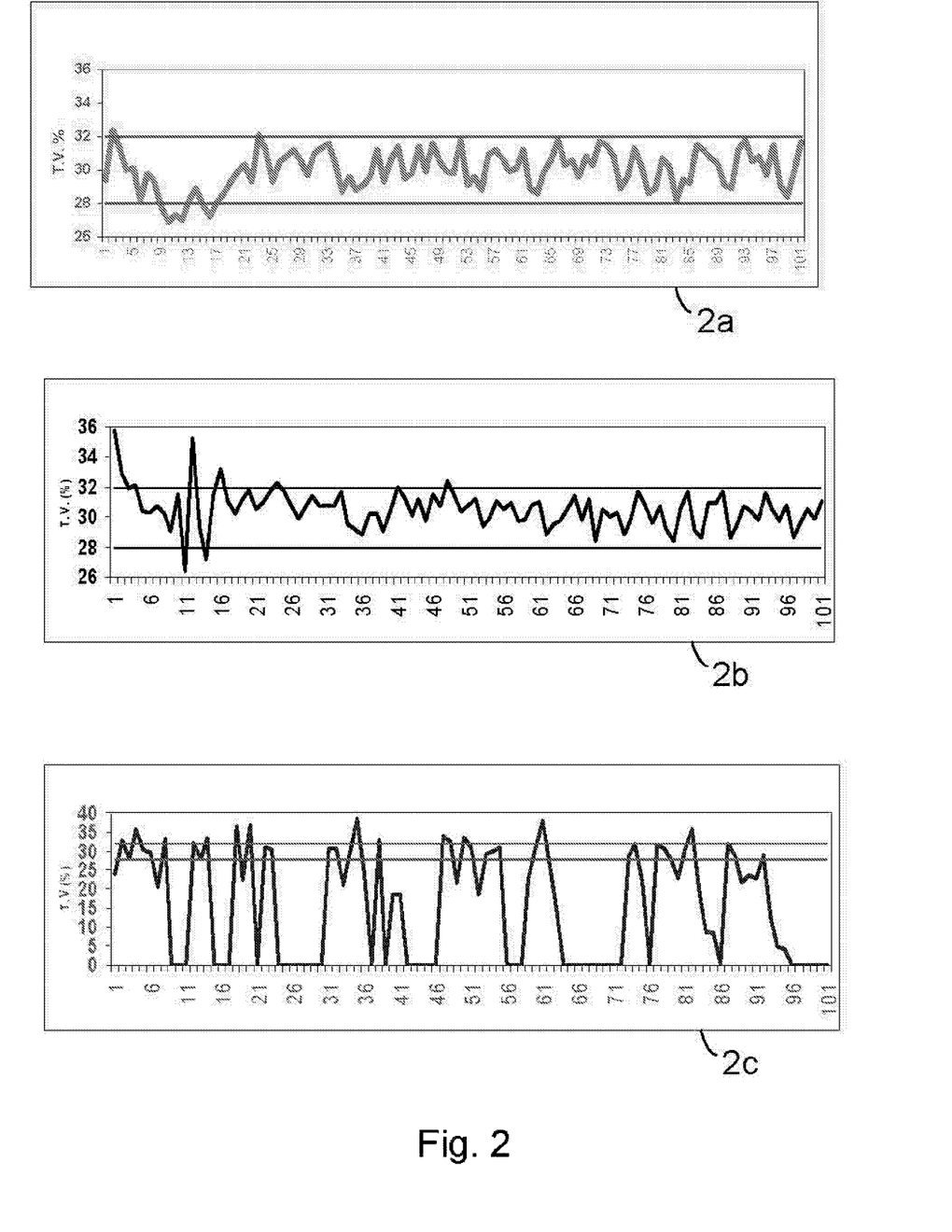
FIGS. 2a, 2b, and 2c are graphical illustrations of the glass content as a function of the number of the part manufactured during successive cycles according to various aspects of the present invention.

The variations in composition of parts after 101 successive injection molding cycles were analyzed. FIGS. 2a, 2b and 2c give the glass contents (GC) as a function of the number of the part manufactured during successive cycles, when a granule according to Example 3 (FIG. 2a), a granule according to Example 4 (FIG. 2b) or long chopped strands according to Example 1 (FIG. 2c), respectively, were used to feed the hopper with glass fibers. A zero value in FIG. 2c means that the flow of the chopped strands could not take place during the corresponding cycle owing to the formation of bridges.

It should therefore be pointed out that the results arising from implementing the process according to the invention (FIG. 2a) are substantially identical to those obtained according to the prior art (FIG. 2b).

Example 9

The dispersion of the fibers within the composite part finally obtained was measured on the products resulting from examples 1, 3, 4 and 5.

This measurement consisted in evaluating the surface portion of the part for which the glass fiber is insufficiently dispersed.

To do this, the dispersion of the glass granules or glass filaments in the thermoplastic matrix was evaluated after the blend was injection molded as a plaque with a thickness of 2 mm and of controlled dimensions. This measurement consisted in evaluating the area occupied by the mass of fibers that were not dispersed within the plaque, it being possible for the undispersed filaments to be both within the actual plaque and on the surface, the small thickness of the plaque making it possible to see the undispersed filaments within the plaque by holding it up to the light.

In practice, the glass fiber is injected by the single-screw device with the thermoplastic material into a mold/countermold of specific shape, making it possible to obtain a very thin plaque of perfectly defined dimensions, on which measurements were carried out in order to compare the dispersion of the glass fibers on the various products obtained. The plaque was placed on an illumination system making it possible for certain areas of the plaque for which clumps of fiber resulting from poor dispersion are present, to be displayed.

The result of this area is expressed as a percent of the total area of the part analyzed.

A digital photograph of this plaque was then taken, under defined positioning conditions of the camera, or using a scanner.

This image was then analyzed by Mesurim® image analysis software.

The software was used to transcribe an analysis carried out on a number of pixels into a result in the form of a percentage area exhibiting poor dispersion of the fibers, relative to the total area of the plaque.

The injection molding of the fiber/matrix blend within the plaque by the single-screw device was carried out in two different experimental modes.

Condition 1: back-pressure of 0 bar on the injection screw and use of a standard screw speed, i.e. around 130 revolutions per minute.

Condition 2: back-pressure of 120 bar (12 MPa) applied to the injection screw, to limit its recoil during blending of the material during the metering and injection phases and use of a slower screw speed (80 revolutions per minute) at the end of metering. These conditions allow pressure to be applied to the glass/matrix blend at the end of the screw before the actual injection and to increase the mixing time of the materials in the screw, without the cycle time being modified, in order to improve dispersion and impregnation of the fiber.

Table 4 gives the results obtained for these two modes, for the parts obtained from the semifinished products used for introducing the glass, described in Examples 1, 3, 4 and 5.

TABLE 4

| % of the total area scanned | Long chopped strands (Example 1) | 99% glass/EVA granules (Example 3) | Thermoplastic/ 30% glass granules (Example 4) | 99% glass/grafted PP granules (Example 5) |
|---|---|---|---|---|
| Condition 1 (0 bar and standard screw rotation speed) | 14 | 5 | 1 | 12 |
| Condition 2 (120 bar and reduced screw rotation speed) | 7 | 1 | 1 | 7 |

Example 10

In this example, the mechanical performance of the composite parts manufactured from the long fibers obtained according to Example 1 or from the granules obtained according to Example 3 or 4, using the process according to the invention, were evaluated under the conditions for achieving the best results for each of them.

The flexural strengths and the Charpy and Izod impact strengths were measured under the conditions defined by the standards ISO 178, ISO 179 and ISO 180 respectively.

The results obtained are given in Table 5 for a base of 100 attributed to the thermoplastic/30% glass granule according to Example 4. The measurements were carried out on composite parts obtained under injection molding condition 1 or 2, making it possible to achieve their best mechanical properties.

TABLE 5

| | Long chopped strands (Example 1) | 99% glass/EVA granules (Example 3) | Thermoplastic/30% glass granules (Example 4) |
|---|---|---|---|
| Injection molding conditions | Condition 1 of Example 9 | Condition 2 of Example 9 | Condition 1 of Example 9 |
| Flexural strength | 68 | 95 | 100 |
| Izod strength | 69 | 97 | 100 |
| Charpy strength | 67 | 92 | 100 |

The mechanical properties of the composite parts obtained from the process according to the invention are comparable to those of composite parts obtained from thermoplastic granules of the prior art.

The invention claimed is:

1. A process for manufacturing a composite part formed by the association of a theimoplastic polypropylene matrix reinforced with long glass fibers, said process comprising:
   supplying a thermoplastic polypropylene resin and high density glass granules to an injection or injection-compression device containing a single screw, said high density glass granules having a density or glass content between 90 and 99.5% and a length/diameter ratio L/D less than L, expressed in mm;
   wherein said high density glass granules are Ruined from chopped fiber strands having lengths between 6 and 30 mm, said high density glass granules having a length substantially identical to that of the length of the longest of said chopped strands; said high density glass granules being formed by mixing sized chopped fiber strands, water and optionally an ethylene vinyl acetate binding agent,
   wherein said sized chopped fiber strands are formed by mixing long fiber glass filaments coated with a sizing liquid including, based on the solids content of the sizing liquid,
   10 to 99 wt. % of a member selected from the group consisting of an aqueous emulsion of an ethylene-vinyl acetate copolymer having an ethylene content of 50% or higher and an aqueous emulsion of an ethylene-acrylic acid copolymer having an ethylene content of 50% or higher;
   1 to 30% of an aqueous emulsion of a maleic-anhydride-grafted polypropylene; and
   1 to 40% of one or more organosilanes, at least one of which is an aminosilane.

2. The process as claimed in claim 1, wherein the L/D ratio is less than 2/3, L being expressed in mm.

3. The process as claimed in claim 1, wherein the L/D ratio is between L/4 and L/2, L being expressed in mm.

4. The process as claimed in claim 1, wherein said chopped strands are mixed for a period of time sufficient to obtain a desired L/D ratio of said granules.

5. The process as claimed in claim 4, wherein said long fiber glass filaments each have a diameter, said diameter being between 5 and 24 μm.

6. The process as claimed in claim 5, wherein said sizing liquid has a melting point below that of the thermoplastic matrix.

7. The process as claimed in claim 6, wherein a difference between the melting point of the sizing liquid and the melting point of the thermoplastic matrix is greater than at least 5° C.

8. A composite part obtained by the process claimed in claim 6.

9. The process as claimed in claim 1, wherein said sizing liquid further comprises one or more members selected from:
   a stabilizer for the formulation;
   an aqueous emulsion of a film-forming polymer; and
   process aids.

10. A process for manufacturing a composite part formed by the association of a thermoplastic polypropylene matrix reinforced with long glass fibers comprising:
    supplying a thermoplastic polypropylene resin and glass granules having a glass content between 90 and 99.5% and a length/diameter ratio L/D less than L to an injection or injection-compression device containing a single screw, said high density glass granules being formed of long fiber chopped strands having lengths between 9 and 30 mm,
    wherein said long fiber chopped strands are formed of long fiber glass filaments coated with a sizing liquid including, based on the solids content of the sizing liquid,
    10 to 99% of a member selected from the group consisting of an aqueous emulsion of an ethylene-vinyl acetate copolymer having an ethylene content of 50% or higher and an aqueous emulsion of an ethylene-acrylic acid copolymer having an ethylene content of 50% or higher;
    1 to 30% of an aqueous emulsion of a maleic-anhydride-grafted polypropylene; and
    1 to 40% of one or more organosilanes, at least one of which is an aminosilane.

11. The process of claim 10, wherein said single screw has a screw speed, said screw speed being 80 revolutions per minute.

12. The process of claim 10, wherein said sizing liquid further comprises one or more members selected from the group consisting of a stabilizer, an aqueous emulsion of a film-forming polymer and process aids.

13. A process for making a fiberglass reinforced plastic composite molded part in an injection molding or injection-compression molding single screw extruder from separate supplies of the thermoplastic organic material and glass fibers without amalgamating the thermoplastic organic material and glass fibers into preformed granules or pellets prior to feeding the thermoplastic organic material and glass fibers into the single screw extruder, the process comprising
    feeding the thermoplastic organic material and glass fibers into at least one inlet of the single screw extruder, and
    operating the single screw extruder to cause
      (a) the thermoplastic organic material therein to plasticize,
      (b) the glass fibers therein to be impregnated by and homogeneously dispersed in the plasticized thermoplastic organic material, and
      (c) the homogeneous mixture so formed to be forced into a mold, thereby forming said composite molded part,
    wherein the glass fibers when fed to the single screw extruder are in the form of bundles of long chopped strands, these bundles having a length of 6 to 30 mm, a glass fiber content of 90 to 99.5 wt. %, and a length/diameter ratio (L/D) which is less than L, expressed in mm.

14. The process of claim 13, wherein the single screw extruder includes a supply hopper and further wherein the fiberglass bundles and the thermoplastic organic material are separately fed to the same supply hopper.

15. The process of claim 13, wherein the single screw extruder includes a supply hopper and further wherein the fiberglass bundles and the thermoplastic organic material are formed into a blend before being fed to the supply hopper.

16. The process of claim 13, wherein the thermoplastic organic material is a polypropylene resin and further wherein the glass fibers are coated with a sizing liquid comprising
    10 to 99% of a member selected from the group consisting of an aqueous emulsion of an ethylene-vinyl acetate copolymer having an ethylene content of 50% or higher and an aqueous emulsion of an ethylene-acrylic acid copolymer having an ethylene content of 50% or higher;
    1 to 30% of an aqueous emulsion of a maleic-anhydride-grafted polypropylene; and
    1 to 40% of one or more organosilanes, at least one of which is an aminosilane,
    the percents being based on the solids content of the sizing liquid.

17. A process for making a fiberglass reinforced plastic composite molded part in an injection molding or injection-compression molding single screw extruder from separate supplies of the thermoplastic organic material and glass fibers, the process comprising feeding the thermoplastic organic material and glass fibers into at least one inlet of the single screw extruder, and operating the single screw extruder to cause
 (a) the thermoplastic organic material therein to plasticize,
 (b) the glass fibers therein to be impregnated by and homogeneously dispersed in the plasticized thermoplastic organic material, and
 (c) the homogeneous mixture so formed to be forced into a mold, thereby forming said composite molded part,
wherein the glass fibers when fed to the single screw extruder are in the form of bundles of long chopped strands, these bundles having a length of 6 to 30 mm, a glass fiber content of 90 to 99.5 wt. %, and a length/diameter ratio (L/D) which is less than L, expressed in mm.

18. The process of claim 17, wherein the single screw extruder includes a supply hopper and further wherein the fiberglass bundles and the thermoplastic organic material are separately fed to the same supply hopper.

19. The process of claim 17, wherein the single screw extruder includes a supply hopper and further wherein the fiberglass bundles and the thermoplastic organic material are formed into a blend before being fed to the supply hopper.

20. The process of claim 17, wherein the thermoplastic organic material is a polypropylene resin and further wherein the glass fibers are coated with a sizing liquid comprising
 10 to 99% of a member selected from the group consisting of an aqueous emulsion of an ethylene-vinyl acetate copolymer having an ethylene content of 50% or higher and an aqueous emulsion of an ethylene-acrylic acid copolymer having an ethylene content of 50% or higher;
 1 to 30% of an aqueous emulsion of a maleic-anhydride-grafted polypropylene; and
 1 to 40% of one or more organosilanes, at least one of which is an aminosilane,
the percents being based on the solids content of the sizing liquid.

* * * * *

UNITED STATES PATENT AND TRADEMARK OFFICE
CERTIFICATE OF CORRECTION

| | | |
|---|---|---|
| PATENT NO. | : 7,951,317 B2 | Page 1 of 1 |
| APPLICATION NO. | : 11/913322 | |
| DATED | : May 31, 2011 | |
| INVENTOR(S) | : Barnaud et al. | |

It is certified that error appears in the above-identified patent and that said Letters Patent is hereby corrected as shown below:

Column 13, line 3: please delete "theimoplastic" and replace with --thermoplastic--

Column 13, line 11: please delete "Ruined" and replace with --formed--

Signed and Sealed this
Twenty-third Day of August, 2011

David J. Kappos
*Director of the United States Patent and Trademark Office*